(12) United States Patent
Cingolani

(10) Patent No.: US 9,206,823 B2
(45) Date of Patent: Dec. 8, 2015

(54) MODULAR CYLINDRICAL SEAT SYSTEM

(76) Inventor: Angela Cingolani, Rome (IT)

( * ) Notice: Subject to any disclaimer, the term of this patent is extended or adjusted under 35 U.S.C. 154(b) by 0 days.

(21) Appl. No.: 14/240,080

(22) PCT Filed: Aug. 10, 2012

(86) PCT No.: PCT/IB2012/054077
§ 371 (c)(1),
(2), (4) Date: Feb. 21, 2014

(87) PCT Pub. No.: WO2013/027147
PCT Pub. Date: Feb. 28, 2013

(65) Prior Publication Data
US 2014/0186097 A1    Jul. 3, 2014

(30) Foreign Application Priority Data

Aug. 24, 2011 (IT) .............................. RM2011A0445

(51) Int. Cl.
| | |
|---|---|
| F16B 9/00 | (2006.01) |
| F16B 7/00 | (2006.01) |
| A47C 1/124 | (2006.01) |
| A47C 7/00 | (2006.01) |
| A47C 7/58 | (2006.01) |
| A47C 9/00 | (2006.01) |

(52) U.S. Cl.
CPC . *F16B 7/00* (2013.01); *A47C 1/124* (2013.01); *A47C 7/006* (2013.01); *A47C 7/58* (2013.01); *A47C 9/00* (2013.01); *Y10T 403/3906* (2015.01)

(58) Field of Classification Search
CPC ........ F16B 7/00; F16B 7/0406; F16B 7/0413; F16B 7/0433; A01G 9/022; A01G 9/023; A01G 9/027; A47C 1/124; A47C 4/02; A47C 13/005; A47C 7/006; A47C 7/58; A47C 9/00; Y10T 403/3906

USPC ........ 403/389, 391, 396, 398, 188; 47/44, 47; 297/248, 440.14
See application file for complete search history.

(56) References Cited

U.S. PATENT DOCUMENTS

| | | | | |
|---|---|---|---|---|
| 184,064 | A | * 11/1876 | Dual | ................................. 47/47 |
| 1,790,259 | A | * 1/1931 | Bush | ........................... 47/41.01 |
| 2,729,259 | A | * 1/1956 | Abrams | ....................... 215/12.1 |

(Continued)

FOREIGN PATENT DOCUMENTS

| | | | | |
|---|---|---|---|---|
| DE | 93 02 234 | | 4/1993 | |
| DE | 4210012 | A1 * | 10/1993 | ............... B65F 1/00 |
| DE | 94 10 004 | | 11/1994 | |
| FR | 2 763 052 | | 11/1998 | |
| FR | 2 917 385 | | 12/2008 | |
| WO | 2007/000791 | | 1/2007 | |

OTHER PUBLICATIONS

International Search Report dated Nov. 5, 2012, corresponding to PCT/IB2012/054077.

*Primary Examiner* — Gregory Binda
*Assistant Examiner* — Nahid Amiri
(74) *Attorney, Agent, or Firm* — Young & Thompson

(57) ABSTRACT

Modulatable integrated system for connecting at least two cylindrical elements (9) composed of a rigid vertical rod (1) connected to at least three solid rings (2, 3, 4) capable of containing the cylinders and having analogous diameter, characterized in that the three solid rings are connected to the rigid rod (1) in a manner so as to form three separate levels that are equidistant from each other, parallel to each other and orthogonal to the axis of the rigid rod (1), and are arranged in a manner such that two of the solid rings (2 and 4) are perfectly superimposed.

11 Claims, 5 Drawing Sheets

(56) References Cited

U.S. PATENT DOCUMENTS

| | | | |
|---|---|---|---|
| 3,141,644 A * | 7/1964 | Baird | 248/146 |
| 3,173,547 A * | 3/1965 | Alissandratos | 211/85.19 |
| 4,880,119 A * | 11/1989 | Simon | 206/584 |
| 5,474,273 A * | 12/1995 | Vinal | 248/311.2 |
| 5,542,210 A * | 8/1996 | Hupfl | 47/47 |
| 5,626,240 A * | 5/1997 | Friedrichs et al. | 209/702 |
| 5,966,865 A * | 10/1999 | Jones | 47/41.01 |
| D422,287 S * | 4/2000 | Gibson et al. | D15/83 |
| 2003/0060332 A1* | 3/2003 | Chen | 482/23 |
| 2003/0102644 A1* | 6/2003 | Figueroa | 280/47.35 |

\* cited by examiner

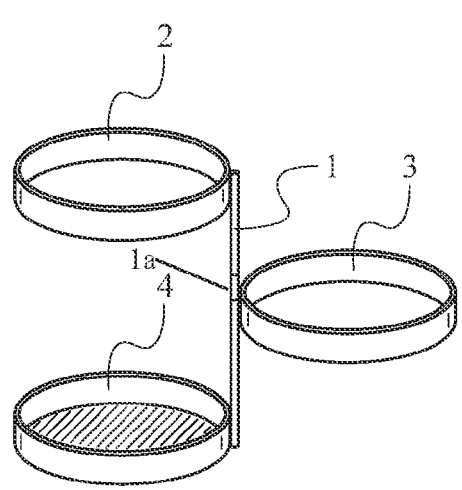
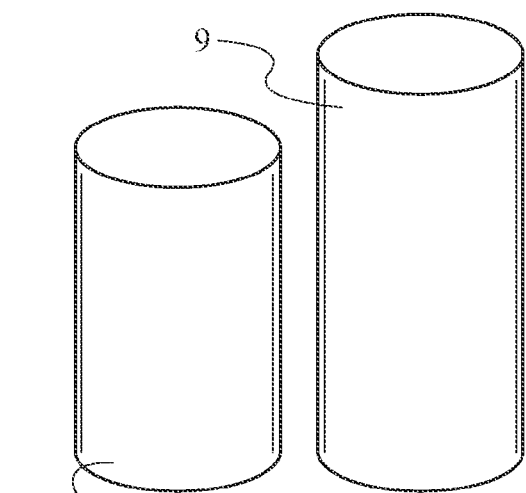
Fig. 1a
Fig. 1b
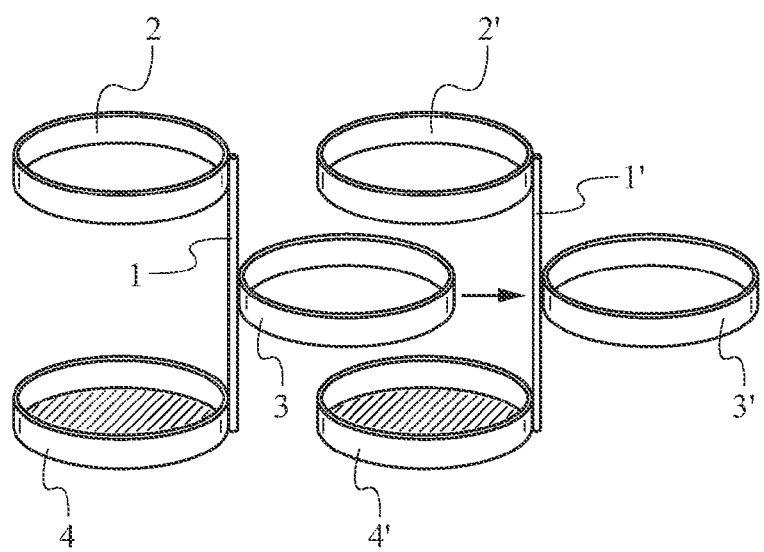
Fig. 2

MODULAR CYLINDRICAL SEAT SYSTEM

PRIOR ART

Up to now, in order to furnish and organize large rooms or public premises, different types of couches, stools, chairs and seats are used of various sizes. However, all of the aforesaid different seats have the drawback of being subjected to very specific static forms, such as couches, or they are subjected to being completely free of any connection, such as seats or stools, giving rise to settings that are overly static or chaotic, if not decidedly disordered. The present invention intends to solve these problems by supplying a plurality of seats which are modulatable, safe and stable but at the same time capable of being organized in any form, allowing the organization of spaces in the most functional, quickest manner possible. In addition, the fact that a plurality of independent seats (such as chairs and stools) are found in public premises increases the risk of involuntary falls, bulk and controversy of various type that can cause tension and problems for users. In private homes, on the other hand, the single furnishing elements such as the stools and chairs can be dangerous if used improperly by the elderly, or even worse by children, resulting unstable and hence dangerous.

The present patent application is intended for those who must furnish any one public or private premises, intervening in settings that may even be quite different from each other: from waiting rooms to children's rooms, from bars and restaurants to the living rooms and bedrooms of private homes. The extreme modulatability, the safety and limited cost are some of the indispensable characteristics of the present invention. The safety of the seats described in the present patent is correlated with the intrinsic stability of cylindrical structures; the safety is ensured by the plurality of vertical rings and rods that stably and integrally constrain the single components of each seat, preventing each component from overturning.

The present invention therefore intends to describe an innovative integrated seating system, characterized by the presence of at least two, preferably a plurality, of seats characterized by a substantially cylindrical form, connected to each other by means of rings of circular form which externally enclose said cylinders. Said circular rings are in turn directly connected to at least one vertical rod 1. The present patent application therefore intends to describe and claim a modulatable integrated system for connecting at least two seats, characterized by the presence of seats 9 with substantially cylindrical form, by at least one rigid vertical rod 1 connected to at least three solid rings 2, 3, 4 capable of containing said cylindrical elements 9 and having analogous diameter; said system is also characterized in that said three rings have substantially circular form and are directly connected to said vertical rigid rod 1 in a manner such to form three separate levels, equidistant from each other, parallel to each other and orthogonal, i.e. forming a 90° angle, with respect to the axis of said rigid rod 1 and being arranged in a manner such that only two of said rings 2 and 4 are perfectly superimposed.

BRIEF DESCRIPTION OF THE DRAWINGS

The invention that is the object of the present patent application will now be represented and described by means of 10 figures that show the interaction between the single elements in detail, such elements in their entirety constituting the integrated seating system that is the object of the present invention:

FIG. 1*a* shows an embodiment of the integrated system of the present application.

FIG. 1*b* shows the cylindrical seats for the integrated system of FIG. 1*a*.

FIG. 2 shows the interaction of a plurality of the integrated systems of FIG. 1*a*.

DESCRIPTION OF PREFERRED EMBODIMENTS

Figure 3:
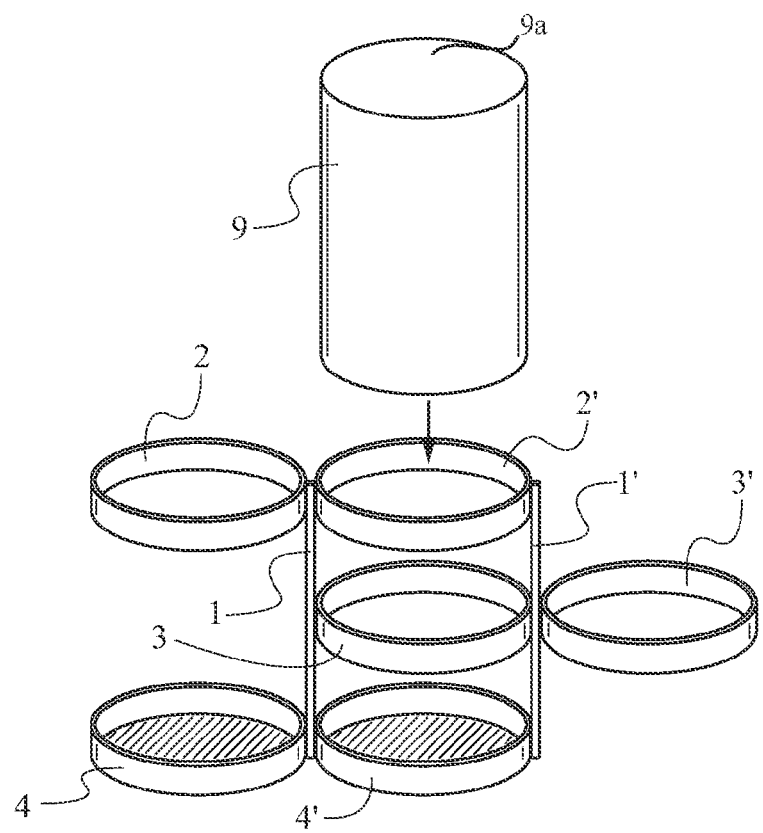
FIG. 3 shows the interaction of a cylindrical seat with a plurality of the integrated systems of FIG. 1*a*.

The figures will now be described in greater detail.

FIG. 1 shows the vertical rod 1 to which the three rings 2, 3 and 4 are directly connected; one notes that the ring 4 is provided with a flat lower surface adapted to support the cylindrical element 9 when inserted inside the rings 2 and 4.

FIG. 2 shows how two integrated seating systems according to the present invention are combined together. One notes how the ring 3 connected to the vertical rod 1 is positioned in a manner so as to be arranged precisely aligned and at an intermediate distance between the rings 2' and 4' connected to the vertical rod 1', in a manner such that the cylindrical element 9 can be inserted inside the rings 2', 3 and 4', making them integral with each other.

FIG. 3 shows, once the three rings 2', 3 and 4' shown in FIG. 2 are aligned, how the cylindrical element 9 is precisely inserted inside the three aforesaid circular rings 2', 3, 4'. The insertion of the cylindrical element 9 allows the ring 3 connected to the vertical rod 1 to be maintained perfectly and stably aligned with the rings 2' and 4' connected with the rod 1' in a manner so as to make the set repeatable ad infinitum.

Figure 4:
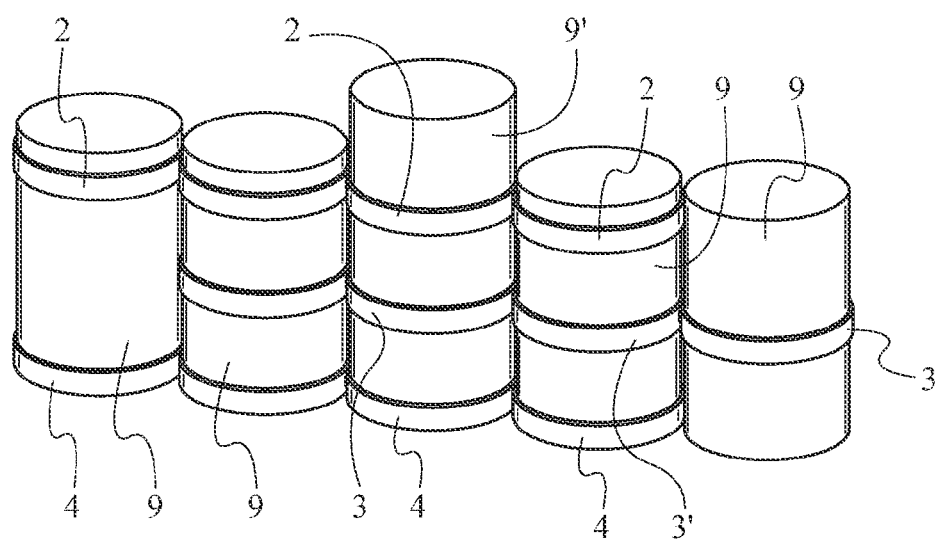
FIGS. 4, 5, 6, and 7 show various embodiments of a plurality of the integrated systems of FIG. 1*a* with cylindrical seats inserted.

FIG. 4 shows a plurality of seats according to the present invention in which the cylindrical elements 9 and 9' are visible, provided with different heights and arranged in a manner so as to form a substantially straight line of seats.

Figure 5:
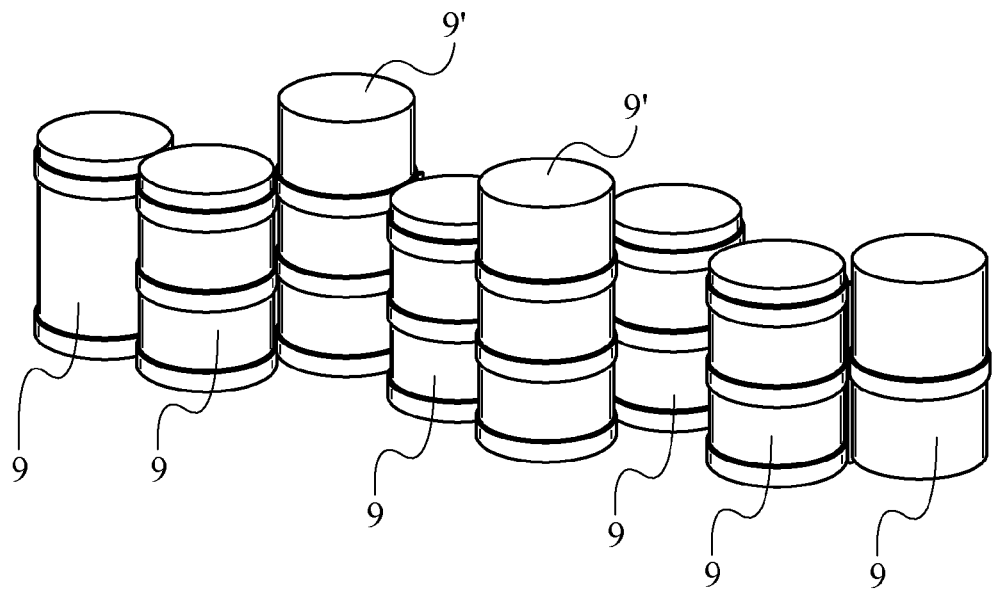

FIG. 5 shows a plurality of seats according to the present invention in which the cylindrical elements 9 and 9' are visible, provided with different heights and arranged in a manner so as to form a substantially sinuous line.

Figure 6:
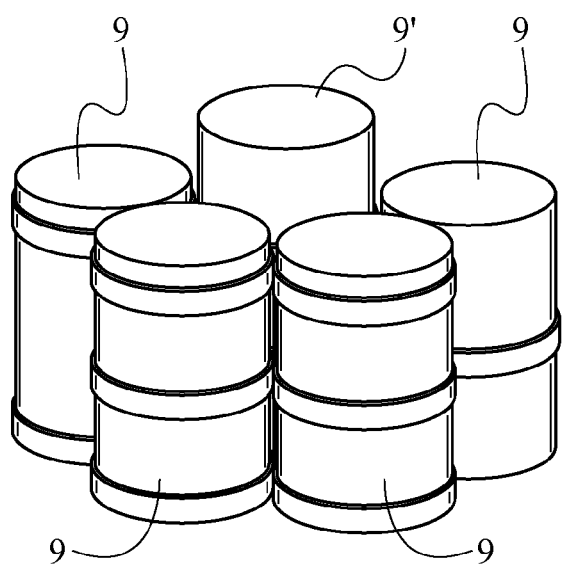

FIG. 6 shows a plurality of seats according to the present invention in which the cylindrical elements 9 and 9' are visible, provided with different heights and arranged in a manner so as to form a semicircle.

Figure 7:
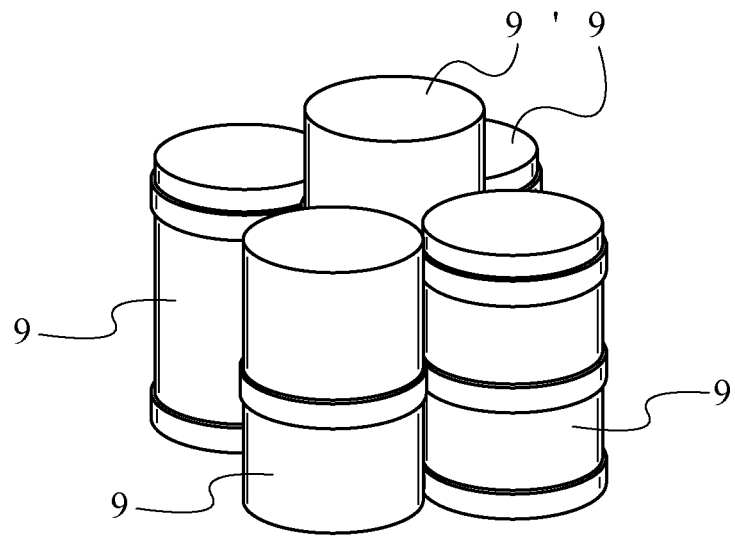

FIG. 7 shows a plurality of seats according to the present invention in which the cylindrical elements 9 and 9' are visible, provided with different heights and arranged in a manner so as to form a circular arrangement.

Figure 8:
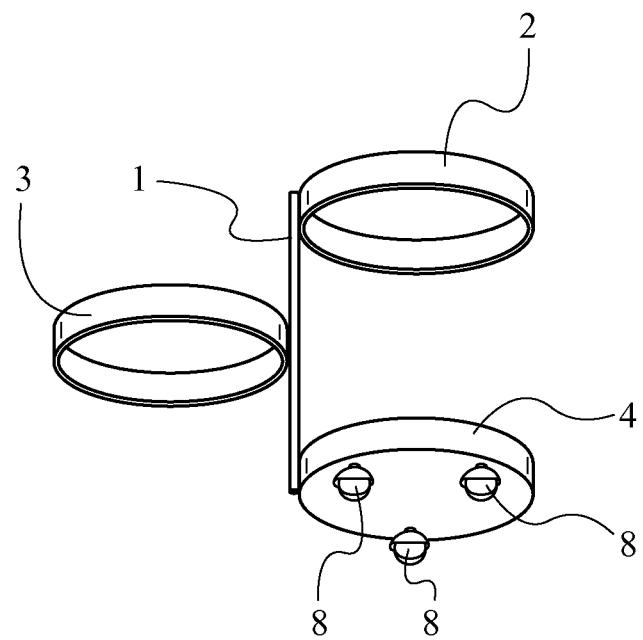
FIGS. 8-9 show bottoms of embodiments of the integrated system of the present application.

FIG. 8 shows the vertical rod 1 provided with three rings 2, 3, 4 according to the present invention, in which one observes that the lower ring 4 is provided with a flat surface adapted to support the cylindrical element 9 and to house a plurality of small wheels 8.

Figure 9:
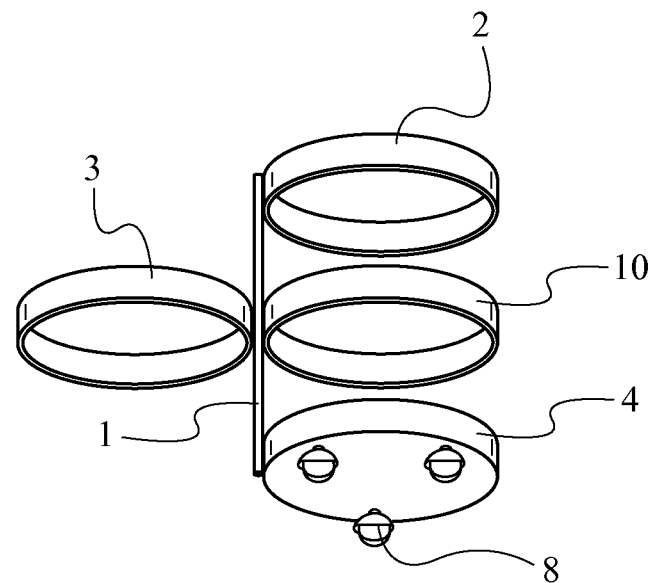

FIG. 9 shows the vertical rod 1 provided with four rings 2, 3, 4 and 10 according to the present invention, in which one observes that the lower ring 4 is equipped with a flat surface adapted to house a plurality of small wheels 8 in order to facilitate the sliding thereof. The ring 10 allows placing the structure according to the present invention in terminal position, being equipped with the three rings 2, 10 and 4 placed on the same axis and the ring 3 placed on a different axis.

Figure 10:
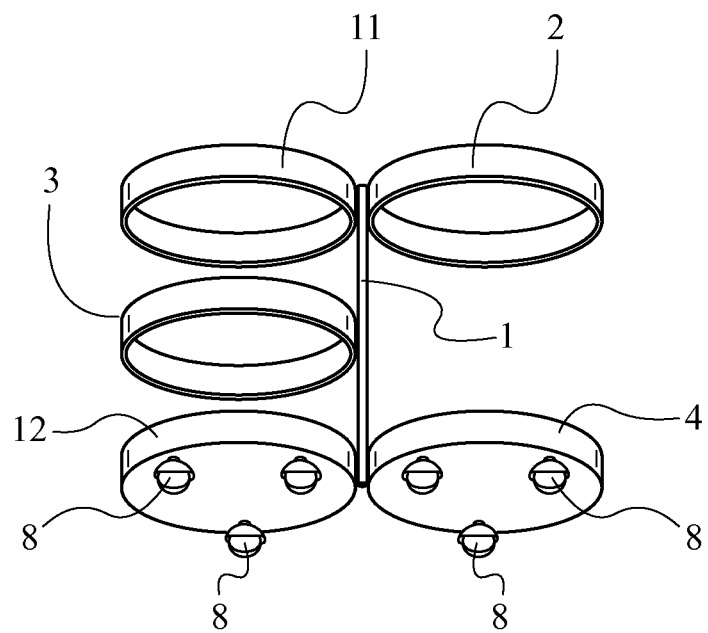
FIG. 10 shows an alternative embodiment of the integrated system of the present application.

FIG. 10 shows the vertical rod 1 which in addition to be provided with the three rings 2, 3, 4 according to the present invention is provided with two further rings, 11 and 12, in a manner so as to be placed in terminal position. In addition, one observes that the lower rings 4 and 12 are provided with a flat surface adapted to house a plurality of small wheels 8 on the lower side.

The aforesaid rigid structure shown in FIGS. 2 and 3 allows inserting, inside the rings 2, 3 and 4, the cylindrical elements 9 on which it is possible to sit. The seats obtained are therefore of the exact same number as the cylindrical elements 9 present, and the latter are connected to each other due to the vertical rods 1 via said rings 2, 3, 4. The rings are of circular, semicircular or elliptical form and can be connected to the rods 1 by means of rigid joints, such as stable welding and pasting, or alternatively movable connections can be obtained equipped with hinges 1a, in a manner so as to allow the rotation of the rings around the axis constituted by the rigid rod 1. Said free rotation allows increasingly and continuously angling the single rigid elements with respect to each other. The vertical rod 1 and rings 2, 3, 4 may be made of any metal, metal alloy, natural plastic material or solid synthetic material. Practically, with the use of the hinges, it is possible to continuously move the seats with respect to each other, so as to organize them around a table, a bench or any other furnishing element. In the absence of the hinges between the rings 2, 3, 4 and the vertical rod 1, the angle change of the structure can be modified only at the time of insertion of the cylindrical element 9. The cylindrical elements can be provided on the lower part, i.e. on their lower face, with one or more wheels or small wheels 8 for facilitating the movement thereof; the cylindrical elements can be provided on the upper part, i.e. on the upper face, with a cushion or padding 9a in order to render the seat itself more comfortable. On each cylindrical element, one or multiple persons can be seated, as a function of the diameter of such element.

The cylindrical elements 9 which must be inserted inside the rings 2, 3, 4 can be made of any one metal, metal alloy or they can be made of any one natural material or solid synthetic polymer, such as wood, plastic, fiber glass and carbon fibers. Alternatively, said cylindrical elements can be made of inflatable materials, and therefore equipped with inflation and deflation valve. For such purpose, they can be made of coated PVC or of any other airtight coated fabric. This particular achievement of the invention allows storing numerous deflated cylindrical elements in narrow spaces when they are not being used. At the time of use, it is in fact sufficient to inflate them with a common electric portable compressor analogous to those of pneumatic boats. In order to obtain a further reduction of the storage spaces, the rod 1 can be telescopic and can be contracted until the rings 2, 3, 4 connected thereto are stacked.

At the beginning and at the end of the chain of structures obtained according to the present invention, it is possible to place the vertical rods 1 equipped with four or five circular rings as shown in FIGS. 9 and 10. This configuration is necessary if one wishes to make the entire sequence of seats uniform, equipping each cylindrical element 9 with three support rings and avoiding a configuration of the rings like that of FIG. 4 in which the terminal cylindrical elements have only one or two rings, but rather having a constant, recurring configuration of the rings like that illustrated in FIG. 5. The diameter of the cylindrical elements 9 is comprised between 25 and 150 centimeters, preferably 50 centimeters, while the height varies from 30 to 130 centimeters, preferably 60 centimeters.

The invention claimed is:

1. A modulatable integrated system for connecting cylindrical elements (9), the system comprising:
   at least two said cylindrical elements;
   a rigid vertical rod (1) connected to at least three solid rings (2, 3, 4) that each have a diameter corresponding to a diameter of said cylindrical elements so as to be adapted to hold said cylindrical elements,
   wherein said three solid rings are connected to said rigid rod (1) at three separate levels that are equidistant from each other, parallel to each other and orthogonal to the axis of said rigid rod (1),
   wherein two of said three solid rings (2 and 4) are in registration with one another, and
   wherein one of said cylindrical elements extends through and is held by the two of said solid rings that are in registration and another of said cylindrical elements extends through and is held by one of said solid rings that is not in registration with the other two.

2. The modulatable integrated system for supporting cylindrical elements (9), according to claim 1, wherein the two solid rings (2 and 4) in registration are the lowest and the highest of the three solid rings.

3. The modulatable integrated system for supporting cylindrical elements (9), according to claim 1, further comprising a flat surface on a bottom one of said three solid rings and wheels (8) attached to said flat surface.

4. The modulatable integrated system for supporting cylindrical elements (9), according to claim 1, wherein said rigid rod (1) and said solid rings (2, 3, 4) comprise one of a metal, a metal alloy, a natural plastic material, and a solid synthetic material.

5. The modulatable integrated system for supporting cylindrical elements (9), according to claim 1, wherein the diameter of the cylindrical elements (9) is between 25 and 150 centimeters, and the height is between 25 and 130 centimeters.

6. The modulatable integrated system for supporting cylindrical elements (9), according to claim 1, wherein an upper face of the cylindrical elements is padded.

7. The modulatable integrated system for supporting cylindrical elements (9), according to claim 1, wherein said cylindrical elements (9) are made of inflatable plastic material.

8. The modulatable integrated system for supporting cylindrical elements (9), according to claim 1, wherein the rigid rod (1) is telescopic.

9. The modulatable integrated system for supporting cylindrical elements (9), according to claim 1, comprising five of said solid rings connected to the rigid rod (1), wherein three of said five solid rings are centered on a first axis and two of said five solid rings are centered on a second axis different from the first axis.

10. The modulatable integrated system for supporting cylindrical elements (9), according to claim 1, comprising four of said solid rings connected to the rigid rod (1), wherein three of said four solid rings are centered on a first axis and one of said four solid rings is centered on a second axis different from the first axis.

11. The modulatable integrated system for supporting cylindrical elements (9), according to claim 1, wherein each of said solid rings (2, 3, 4) is connected to the rigid vertical rod (1) by a hinge adapted to make the respective said ring rotate around an axis parallel to the rigid vertical rod (1).

\* \* \* \* \*